US008565307B2

(12) United States Patent
Matsuda et al.

(10) Patent No.: US 8,565,307 B2
(45) Date of Patent: Oct. 22, 2013

(54) PICTURE ENCODING METHOD AND PICTURE ENCODING DEVICE

(75) Inventors: Naoki Matsuda, Osaka (JP); Youji Shibahara, Osaka (JP); Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 1869 days.

(21) Appl. No.: 11/587,414

(22) PCT Filed: Dec. 26, 2005

(86) PCT No.: PCT/JP2005/023788
§ 371 (c)(1),
(2), (4) Date: Nov. 20, 2006

(87) PCT Pub. No.: WO2006/082690
PCT Pub. Date: Aug. 10, 2006

(65) Prior Publication Data
US 2007/0217512 A1  Sep. 20, 2007

(30) Foreign Application Priority Data

Feb. 1, 2005 (JP) ................................. 2005-025401

(51) Int. Cl.
*H04N 11/02* (2006.01)
(52) U.S. Cl.
USPC ........ 375/240.16; 375/240; 375/12; 382/236; 382/238
(58) Field of Classification Search
USPC .......................... 375/240.12–16; 382/236–238
See application file for complete search history.

(56) References Cited

U.S. PATENT DOCUMENTS

| 2004/0114817 | A1* | 6/2004 | Jayant et al. | 382/239 |
| 2005/0053294 | A1* | 3/2005 | Mukerjee et al. | 382/236 |
| 2007/0002948 | A1  | 1/2007 | Shibahara et al. | |
| 2007/0127572 | A1* | 6/2007 | Sasai et al. | 375/240.16 |
| 2008/0008245 | A1* | 1/2008 | Kondo et al. | 375/240.16 |

FOREIGN PATENT DOCUMENTS

| JP | 2000-13802 | 1/2000 |
| JP | 2000-32468 | 1/2000 |
| JP | 2004-349855 | 12/2004 |
| WO | 2005/011286 | 2/2005 |

OTHER PUBLICATIONS

ITU-T H. 264, "*Series H: Audiovisual and Multimedia Systems*", Infrastructure of audiovisual services—Coding of moving video, Telecommunication Standardization Sector of ITU, Mar. 2005.

* cited by examiner

*Primary Examiner* — William C Vaughn, Jr.
*Assistant Examiner* — Luis M Perez
(74) *Attorney, Agent, or Firm* — Wenderoth, Lind & Ponack, L.L.P.

(57) ABSTRACT

For encoding of a picture whose macroblock is divided into parts of various sizes, a picture encoding method is provided to appropriately reduce a coding amount of a motion vector, without lowering coding efficiency. In order to reduce a processing amount and an increase of a coding amount, which result from generation of a large number of motion vectors due to bi-directional prediction selected for a small-sized part, a motion estimation unit selects the optimal prediction method from prediction method candidates decided by a prediction-method-candidate determination unit. Thereby, when motion compensation is performed for a large-sized part, forward-directional, backward-directional, and bi-directional prediction can be permitted. On the other hand when motion compensation is performed for a small-sized part, the bi-directional prediction is prohibited but the forward-directional or backward-directional prediction is permitted.

11 Claims, 10 Drawing Sheets

PICTURE ENCODING METHOD AND PICTURE ENCODING DEVICE

TECHNICAL FIELD

The present invention relates to a picture encoding method or a picture encoding device for applying compression coding to moving picture data.

BACKGROUND ART

Recently, with the arrival of the age of multimedia which integrally handles audio, video and pixel values, existing information media, for example, newspaper, journal, television, radio and telephone, and other means through which information is conveyed to people, has come under the scope of multimedia. In general, multimedia refers to a representation in which not only characters but also graphic symbols, audio and especially pictures and the like are related to each other. However, in order to include the aforementioned existing information media in the scope of multimedia, it appears as a prerequisite to represent such information in digital form.

However, when estimating the amount of information contained in each of the aforementioned information media in digital form, the information amount per character requires 1 to 2 bytes whereas audio requires more than 64 Kbits per second (telephone quality), and a moving picture requires more than 100 Mbits per second (present television reception quality). Therefore, it is not realistic to handle the vast amount of information directly in digital form. For example, a videophone has already been put into practical use via Integrated Services Digital Network (ISDN) with a transmission rate of 64 Kbits/sec to 1.5 Mbits/sec, however, it is impossible to transmit a picture captured by a TV camera.

This therefore requires information compression coding techniques. For instance, in the case of a videophone, compression coding standards called H.261 and H.263 standards recommended by International Telecommunication Union-Telecommunication Standardization Sector (ITU-T) are employed. According to the compression coding standard of the MPEG-1 standard, picture information as well as audio information can be stored in an ordinary music Compact Disc (CD).

Here, Moving Picture Experts Group (MPEG) is an international standard regarding compression methods for compression of moving picture signals. The MPEG-1 standard is a standard that compresses video signals down to 1.5 Mbit/s, namely, to compress the information included in TV signals approximately down to a hundredth. The quality targeted by the MPEG-1 standard was medium quality so as to realize a transmission rate primarily of about 1.5 Mbits/sec, therefore, MPEG-2, standardized with the view to meeting the requirements of even higher quality picture, realizes a TV broadcast quality for transmitting moving picture signals at a transmission rate of 2 to 15 Mbits/sec.

After that, a working group (ISO/IEC JTC1/SC29/WG11) previously in charge of the standardization of the MPEG-1 and then the MPEG-2 has further regulated a MPEG-4 standard which achieves a compression rate superior to the one achieved by the MPEG-1 and the MPEG-2, allows encoding, decoding, and operating on a per-object basis and realizes a new function required by the age of multi media. At first, in the process of the standardization of the MPEG-4 standard, the aim was to standardize a low bit rate coding, however, the aim is presently extended to a more versatile coding with a high bit rate coding for interlaced pictures and others. Moreover, at the presence, the ISO/IEC and the ITU-T have jointly developed, as a next-generation image encoding method, a MPEG-4 Advanced Video Coding (AVC) standard is regulated.

In general, in encoding of a moving picture, the amount of information is compressed by reducing redundancy in temporal and spatial directions. Therefore, an inter-picture prediction coding, which aims at reducing the temporal redundancy, estimates a motion and generates a predictive picture on a block-by-block basis with reference to prior and subsequent pictures, and then encodes a differential value between the obtained predictive picture and a current picture to be encoded. Here, a "picture" is a term to represent a single screen and it represents a frame when used for a progressive picture whereas it represents a frame or fields when used for an interlaced picture. The interlaced picture here is a picture in which a single frame consists of two fields respectively having different time. For encoding and decoding an interlaced picture, three ways are possible: processing a single frame either as a frame, as two fields or as a frame/field structure depending on a block in the frame.

A picture to which an intra-picture prediction coding is performed without reference pictures (in other words, without referring to other pictures) is called an "I-picture". Further, a picture to which the inter-picture prediction coding is performed with reference to only a single prior or subsequent picture is called a "P-picture". A picture to which the inter-picture prediction coding is performed by referring simultaneously to two pictures is called a "B-picture". The B-picture needs, as reference pictures, two pictures displayed either before or after a current picture to be encoded. Here, prediction referring to a picture whose display time is before that of the current picture is called forward-directional prediction, prediction referring to a picture whose display time is after that of the current picture is called backward-directional prediction, and prediction referring to two pictures selected from the pictures whose display time is either before or after that of the current picture, as an arbitrary combination is called bi-directional prediction. The reference image (reference picture) can be designated for each block that is a basic unit for encoding and decoding. However, the reference pictures need to be already encoded and decoded as a condition to encode and decode these I-picture, P-picture, and B-picture.

A motion compensation inter-picture prediction coding is used for encoding the P-picture or the B-picture. Here, the motion compensation inter-picture prediction coding is an encoding method which adopts motion compensation to an inter-picture prediction coding. Moreover, the motion compensation is a method of reducing the amount of data while increasing prediction precision by estimating an amount of motion (hereinafter, referred to as a "motion vector") of each part in a picture not by simply predicting a picture from a pixel value of a reference frame, and by performing prediction in consideration of the estimated amount of data. For example, the amount data is reduced by estimating a motion vector of a current picture to be encoded and encoding a predictive differential between a predicted value which is shifted as much as the estimated motion vector and the current picture to be encoded. Since this method requires information about the motion vector at the time of decoding, the motion vector is also encoded and recorded or transmitted.

However, if the bi-directional prediction is used in inter-picture prediction coding with motion prediction for B-pictures, motion vectors of two directions are required, which results in increase of a coding amount of the motion vectors. Therefore, if the increased coding amount accounts for a significant part of the total coding amount, it is impossible to encode the predictive differential adequately, so that image quality of the encoded picture is lowered.

Thus, as a method for inhibiting the conventional coding amount increase due to motion vectors, if an available coding amount is not enough for a data amount of an input picture, the bi-directional prediction is prohibited from being used. As a result, it is possible to limit generation of a coding amount of motion vectors. This method is proposed in patent reference 1, for example.

FIG. 1 is a block diagram showing one example of a functional structure of the above-described conventional picture encoding device 200. As shown in FIG. 1, the picture encoding device 200 includes a block dividing unit 1, a subtractor 2, a Discrete Cosine Transform (DST) unit 3, a quantization unit 4, a variable length coding unit 5, a buffer 6, a coding amount control unit 7, an inverse quantization unit 8, an Inverse Discrete Cosine Transform (IDCT) unit 9, an adder 10, a memory 11, and a motion estimation unit 12.

Regarding input picture data 101, the block dividing unit 1 divides, per predetermined unit of coding amount, the input picture data 101 into macroblocks each of which has the predetermined number of pixels. The motion estimation unit 12 obtains reference image corresponding to each macroblock from the memory 11, detects a motion vector from the reference image, and outputs a predictive image generated using a motion vector and the above motion vector. The motion vector outputted from the motion estimation unit 12 is not processed by the subtractor 2, the DCT unit 3, nor the quantization unit 4, but is provided to the variable length coding unit 5 to be applied with variable length coding. The subtractor 2 outputs a predictive differential signal representing a differential between the output from the block dividing unit 1 and the predictive image. The DCT unit 3 outputs a signal obtained by applying DCT to the output from the subtractor 2. The quantization unit 4 quantizes the signal outputted from the DCT unit 3, using a quantization parameter outputted from the coding amount control unit 7. Here, the quantization parameter is a parameter representing a quantization step to be used in the quantization unit 4 and the inverse quantization unit 8. Furthermore, the variable length coding unit 5 applies variable length coding to the output from the quantization unit 4, and provides the resulting signal to the buffer 6.

On the other hand, in order to generate reference image, the inverse quantization unit 8 outputs a signal obtained by inversely quantizing the output from the quantization unit 4 using the quantization parameter. The IDCT unit 9 applies IDCT to the inversely-quantized signal, and provides the resulting signal to the adder 10. The adder 10 adds the signal applied with the IDCT with the predictive image to generate reference image, and stores the reference image into the memory 11.

The coding amount control unit 7 calculates a quantization parameter, according to a target coding amount (bit rate) after compression coding, and the total coding amount which the variable length coding unit 5 has been encoded, and then provides the quantization parameter to the quantization unit 4. Thereby the coding amount control unit 7 can control the coding amount. Furthermore, the coding amount control unit 7 outputs a bi-directional prediction control signal to the motion estimation unit 12, when the input picture data (data amount) is too large for the target coding amount. Thereby, it is possible to control the motion estimation unit 12 to prevent from selecting predictive image or a motion vector for the bi-directional prediction (in other words, to control the motion estimation unit 12 to select a predictive image or a motion vector using forward or backward prediction).

According to the above-described conventional device, when the target coding amount is small (in other words, the quantization parameter is great) and the coding amount allocated for frames to be encoded is small, the bi-directional prediction is prohibited to be selected in order to prevent increase of the coding amount of the motion vectors, so that it is possible to reduce lowering of image quality of the encoded picture due to the coding amount increase as described above.
[Patent Document 1] Japanese Patent Application Laid-Open No. 2000-13802

SUMMARY OF THE INVENTION

Problems that Invention is to Solve

However, the above conventional picture encoding device 200 determines whether or not the bi-directional prediction is to be prohibited, only according to the bit rates, so that the following problem occurs. That is, when, after a determination has been made that the bi-directional prediction is not to be prohibited, a macroblock is divided to plural parts (a section for motion compensation), and the motion compensation is to be performed for each of the parts, so that the number of motion vectors in each macroblock is increased more than expectation, depending on the number of the parts. Therefore, the predictive differential cannot be encoded adequately as described above, so that the quality of the encoded image is lowered. Moreover, if the bi-directional prediction is prohibited when the bit rate is more than a moderate degree, compression efficiency is not improved in the bi-directional prediction of image whose bit rates are more than the moderate degree. As a result, there is a problem that, although the controlling of the coding amount can be easily realized, the coding efficiency is decreased.

In view of the above problems, an object of the present invention is to provide a picture encoding method and the like, by which a coding amount for a motion vector is appropriately controlled without lowering coding efficiency, in picture encoding in which a macroblock can be divided into parts of various sizes for motion compensation.

In order to solve the above problems, a picture encoding method according to the present invention of encoding a picture on a block-by-block basis, and includes steps of: deciding a candidate for a prediction method in which a size of motion compensation and a direction of motion prediction are set for a block to be coded; applying motion estimation to the block, by selecting an optimal prediction method from the decided candidates for the prediction method, calculating a motion vector for the block using the selected prediction method, and generating predictive image of the block using the calculated motion vector; and encoding image of the block using the generated predictive image, wherein in the deciding of the candidate for the prediction method, only one of a forward direction and a backward direction is set to the direction of motion prediction, when the block belongs to a B-picture and the size of motion compensation is smaller than a predetermined threshold value.

Thereby, when a macroblock is to be divided into small parts for motion compensation, the bi-directional prediction is prohibited to be selected, so that it is possible, without lowering coding efficiency, to control to prevent from increase of a coding amount which results from increase of the number of motion vectors generated for each macroblock.

Further, in the deciding, each of plural candidates for the prediction method may be decided for each of respective predetermined sizes of motion compensation, and in the applying of the motion estimation, the optimal prediction method may be selected from the decided plural candidates for the prediction method.

Furthermore, when the block belongs to a B-picture and the size of motion compensation is smaller than the predetermined threshold value, the deciding may further include: calculating difficulty in the encoding; and selecting, as the candidate, a prediction method in which only one of a forward direction and a backward direction is set to the direction of motion prediction, only if the calculated difficulty is greater than the predetermined threshold value.

Thereby, only when a difficulty in encoding is greater than a predetermined threshold value, if a motion compensation size is smaller than a predetermined size, the bi-directional prediction is prohibited to be selected, so that it is possible to effectively reduce motion vectors when the increase of a coding amount of the motion vectors significantly affects the total coding amount.

Still further, in the deciding, it is possible that the bigger a size of the picture to which the block belongs to is, the greater the calculated difficulty becomes.

Still further, in the deciding, it is possible that the larger a data amount of the image encoded in the encoding is, the greater the calculated difficulty becomes.

Still further, in the deciding, it is possible that the bigger a frame rate of the picture is, the greater the calculated difficulty becomes.

Still further, in the deciding, it is possible that the higher complexity of the picture to which the block belongs to is, the greater the calculated difficulty becomes.

Still further, in the deciding, the complexity of the picture may be one of a size of a high-frequency component of the picture, a size of intensity variance of the block, and a size of an edge of the block.

Note that the present invention can be also realized as a picture encoding device which has, in the structure, units which performs steps characterized by the above-described picture encoding method. Further, the present invention can be realized as a program causing a personnel computer or the like to execute the steps of the picture encoding method. Here, it is obvious that such a program can be distributed via a memory medium such as a CD-ROM, or a transmission medium such as the Internet.

Furthermore, the present invention can be realized as a large-scale integration (LSI) in which main units in the structure of the picture encoding device are integrated, for example.

Effects of the Invention

According to the present invention, in picture encoding in which a macroblock can be divided into plural parts and motion compensation can be applied to each of the parts, the bi-directional prediction is prohibited to be selected for the macroblock. Therefore, it is possible, without lowering coding efficiency, to control to prevent increase of a coding amount which results from increase of the number of motion vectors generated for each macroblock. As a result, the lowering of the coding efficiency can be prevented.

Figure 1:
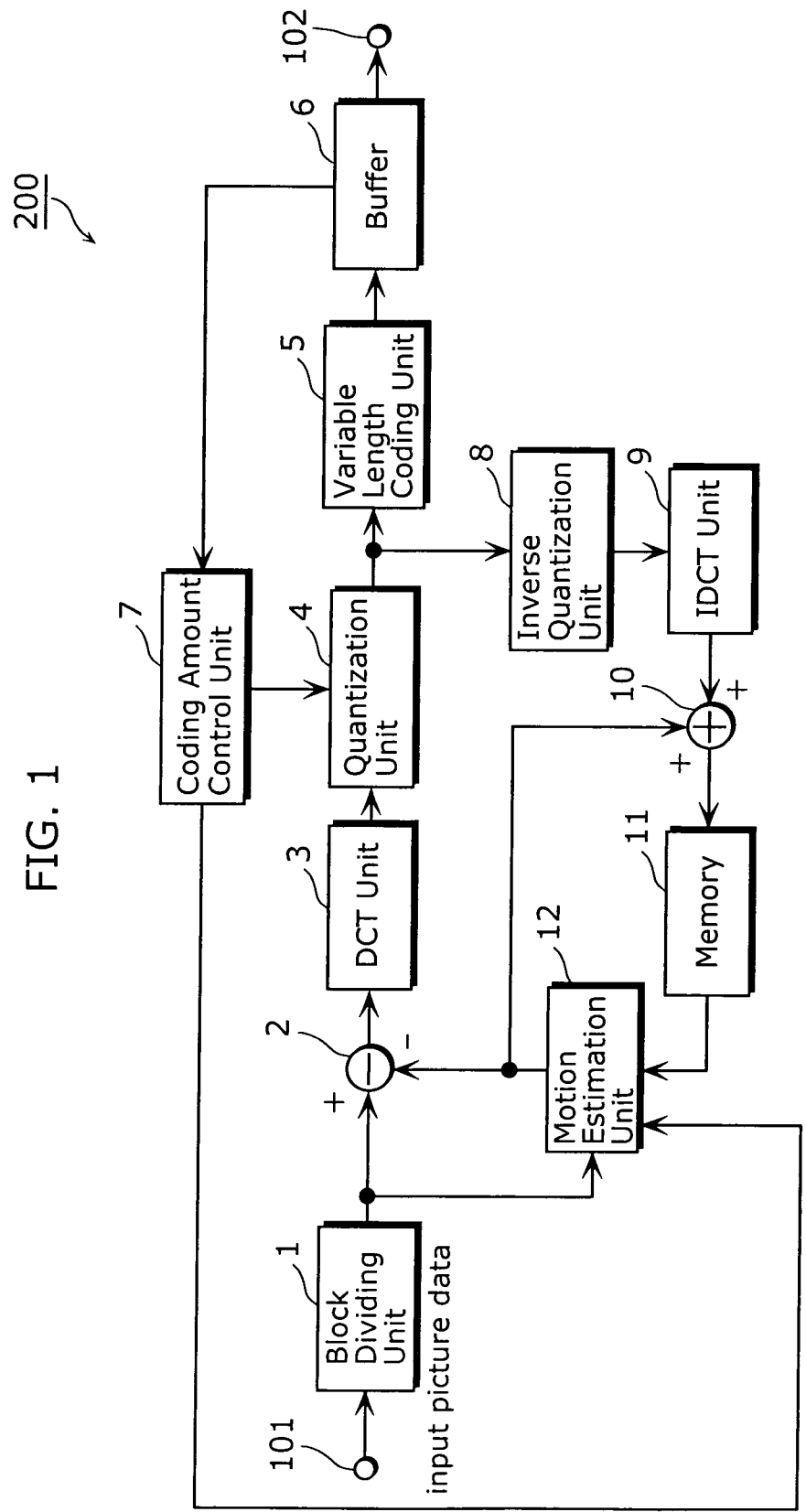
FIG. 1 is a block diagram showing a functional structure of the conventional picture encoding device.

NUMERICAL REFERENCES 1 block dividing unit
2 subtractor
3 DCT unit
4 quantization unit
5 variable length coding unit
6 buffer
7 coding amount control unit
8 inverse quantization unit
9 IDCT unit
10 adder
11 memory
12 motion prediction unit
13 prediction-method-candidate decision unit
14 prediction-method-candidate decision unit (using a coding difficulty)
15 coding information
16 picture size
17 bit rate
18 frame rate
19 picture information
20 picture complexity calculation unit
100 picture encoding device
101 input picture signal
102 output bitstream
110 picture encoding device
112 motion estimation unit
120 picture encoding device
130 picture encoding device
140 picture encoding device
150 picture encoding device
200 picture encoding device

DETAILED DESCRIPTION OF THE INVENTION

The following describes embodiments according to the present invention with reference to the drawings. Although the present invention is described using the following embodiments and the attached drawings, these are used only as examples and the present invention is not limited to them.

First Embodiment

Figure 2:
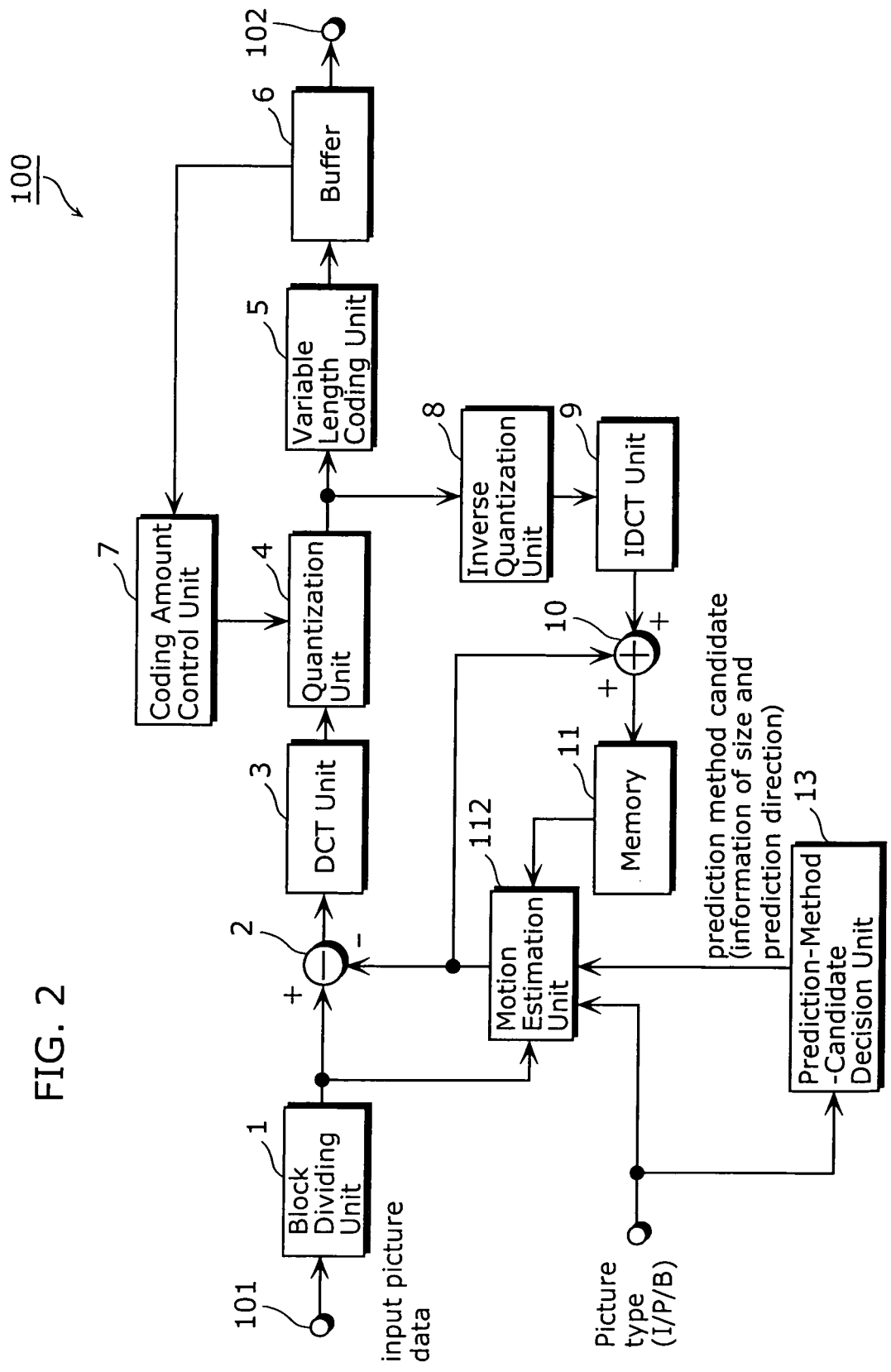
FIG. 2 is a block diagram showing a functional structure of a picture encoding device according to the first embodiment of the present invention.

FIG. 2 is a block diagram showing a functional structure of a picture encoding device 100 according to the first embodiment of the present invention. As shown in FIG. 2, the picture encoding device 100 includes a block dividing unit 1, a subtractor 2, a DCT unit 3, a quantization unit 4, a variable length coding unit 5, a buffer 6, a coding amount control unit 7, an inverse quantization unit 8, an IDCT unit 9, an adder 10, a memory 11, a motion estimation unit 112, and a prediction-method-candidate decision unit 13. Note that the reference numerals in FIG. 1 are assigned to identical elements in FIG. 2, so that the details of those elements are same as described above. Characteristic elements in the first embodiment are the prediction-method-candidate decision unit 13 and the motion estimation unit 112.

The subtractor 2, the DCT unit 3, the quantization unit 4, the variable length coding unit 5, and the coding amount control unit 7 are used to encode image of each block, using the predictive image generated by the motion estimation unit 112.

The motion estimation unit 112 selects the optimal prediction method from prediction method candidates decided by the prediction-method-candidate decision unit 13 (more specifically, selects the optimal prediction method from plural candidates for a prediction method, which are decided by the prediction-method-candidate decision unit 13), then calculates a motion vector for the block using the selected prediction method, and thereby generates predictive image for the block using the calculated motion vector.

The prediction-method-candidate decision unit 13 decides, for a block to be encoded, prediction method candidates in which respective available motion compensation sizes and movement prediction directions are set (more specifically, the prediction-method-candidate decision unit 13 decides each of plural prediction method candidates for each of plural predetermined sizes of motion compensation). Furthermore, when the block belongs to a B-picture and the motion compensation size is smaller than a certain threshold value, the prediction-method-candidate decision unit 13 decides, as the candidate, a prediction method by which only a forward direction or a backward direction is set to the motion prediction direction.

Figure 3A:
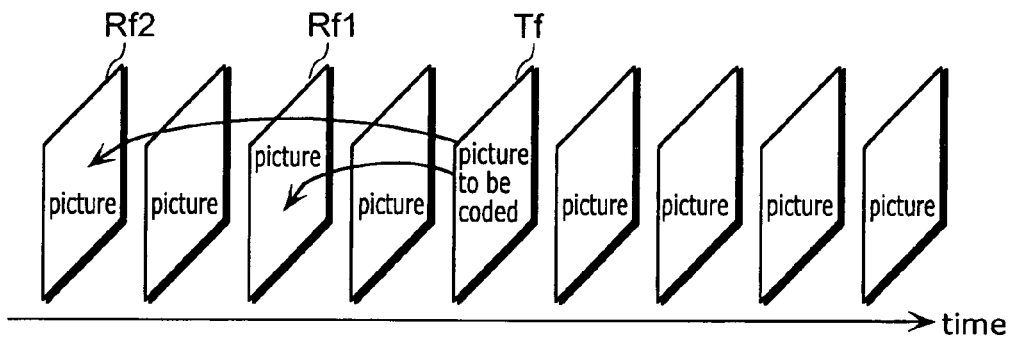
FIGS. 3A to 3C are frame layout diagrams, each of which shows a time position relationship between a reference picture and a picture to be encoded, according to the first embodiment of the present invention.
Figure 3B:
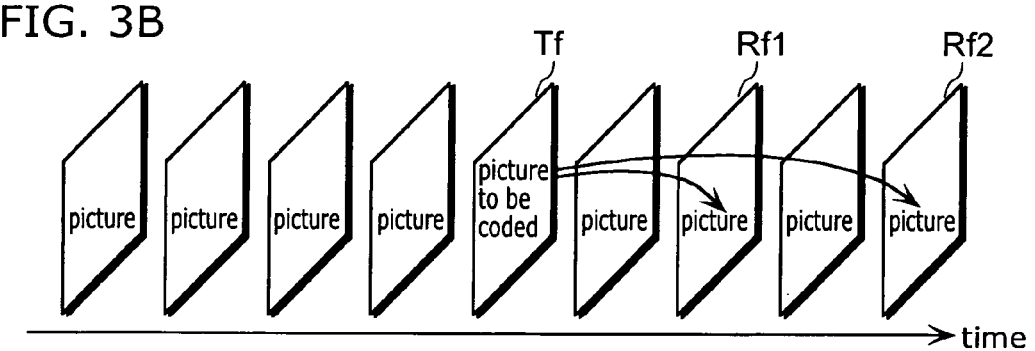
Figure 3C:
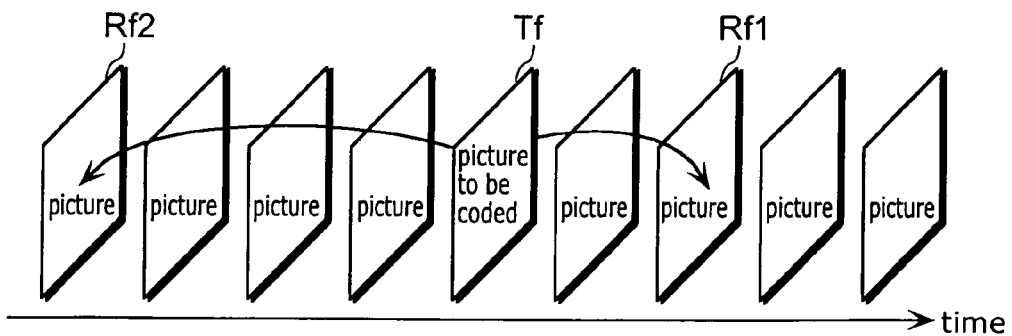

FIGS. 3A to 3C are picture layout diagrams, each of which shows a time position relationship between a reference picture and a picture to be encoded, according to the first embodiment of the present invention. FIG. 3A shows forward-directional prediction, where a target picture Tf, which is to be encoded, is referred to temporally-forward reference picture Rf1 and Rf2. In the same manner, FIG. 3B shows backward-directional prediction, and FIG. 3C shows bi-directional prediction.

Figure 4:
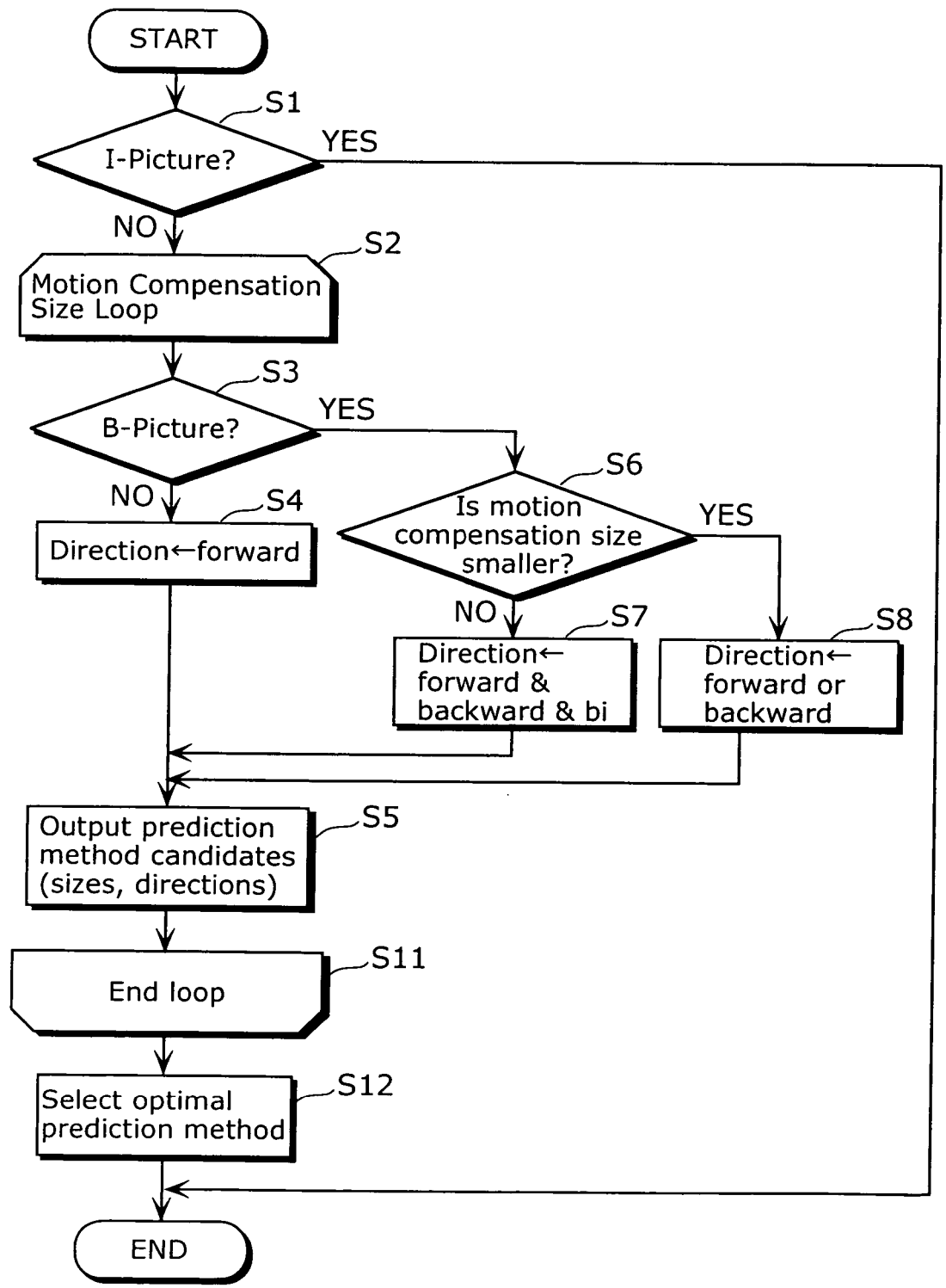
FIG. 4 is a flowchart showing processing for deciding a prediction-method-candidate, performed by the picture encoding device according to the first embodiment of the present invention.

The prediction-method-candidate decision unit 13 decides the prediction method candidates, according to a flowchart as shown in FIG. 4.

Firstly, at Step S1, it is determined as to whether or not a picture type of a picture to which a current block belongs is I-picture. If the picture type is I-picture (YES at S1), then motion compensation is not necessary, so that the processing is terminated without outputting prediction method candidates. If the picture type is not I-picture (NO at S1), then motion compensation is to be performed. Therefore, a motion compensation size loop of Step S2 is repeated for each of the plural motion compensation sizes of the prediction method candidates. The motion compensation size loop is processing for outputting, to the motion estimation unit 112, a size of the motion compensation and a prediction direction usable with the motion compensation size (S2 to S11).

In the loop of Steps S2 to S11, the prediction-method-candidate decision unit 13 decides at Step S3 whether nor not the picture type is B-picture. If the picture type is not B-picture, in other words, if the picture type is P-picture (NO at S3), then the prediction direction is only a forward direction, so that the prediction direction is set to a forward direction at Step S4.

On the other hand, if it is determined at Step S3 that the picture type is B-picture (YES at S3), then at Step S6 the prediction-method-candidate decision unit 13 determines whether or not a motion compensation size set in each candidate is smaller than a predetermined size (8×8 pixels, for example). If the size is greater than the predetermined size (NO at S6), then the prediction direction is set to any of the forward direction, the backward direction, and both directions (S7). On the other hand, if the determination is made that the motion compensation size is smaller than the predetermined size (YES at S6), then a forward direction or a backward direction is set to a prediction direction used for the motion prediction (S8).

After that, at Step S5, the prediction-method-candidate decision unit 13 outputs, to the motion estimation unit 12, the respective motion compensation sizes and selected prediction directions regarding the prediction method candidates.

The motion estimation unit 12 performs motion detection using each of the prediction method candidates, according to the motion compensation sizes inputted from the prediction-method-candidate decision unit 13. Thereby, the motion estimation unit 12 obtains the best motion compensation size, the best prediction direction, and the best motion vector, and generates reference image using these best data (S12).

With the above structure, when the motion compensation size is small, the bi-directional prediction is not performed. Therefore, it is possible to reduce memory accesses for the referring of reference image, a processing amount for the motion estimation, and the like, which are generally occurred in each motion compensation. Further, the bi-directional prediction is not selected only when the motion compensation size is small so that the coding efficiency (compression rate) is not significantly affected. Therefore, it is possible to reduce increase of the number of motion vectors for each macroblock, without lowering the coding efficiency, and also possible to reduce increase of a coding amount due to the motion vectors.

Note that the bi-directional prediction may be permitted even if the motion compensation size is small, only in a mode where motion can be estimated from motion vectors of other blocks and the motion vectors are not encoded, like a direct mode of the MPEG-4AVC, because a coding amount of motion vectors is not increased in the mode.

Second Embodiment

Figure 5:
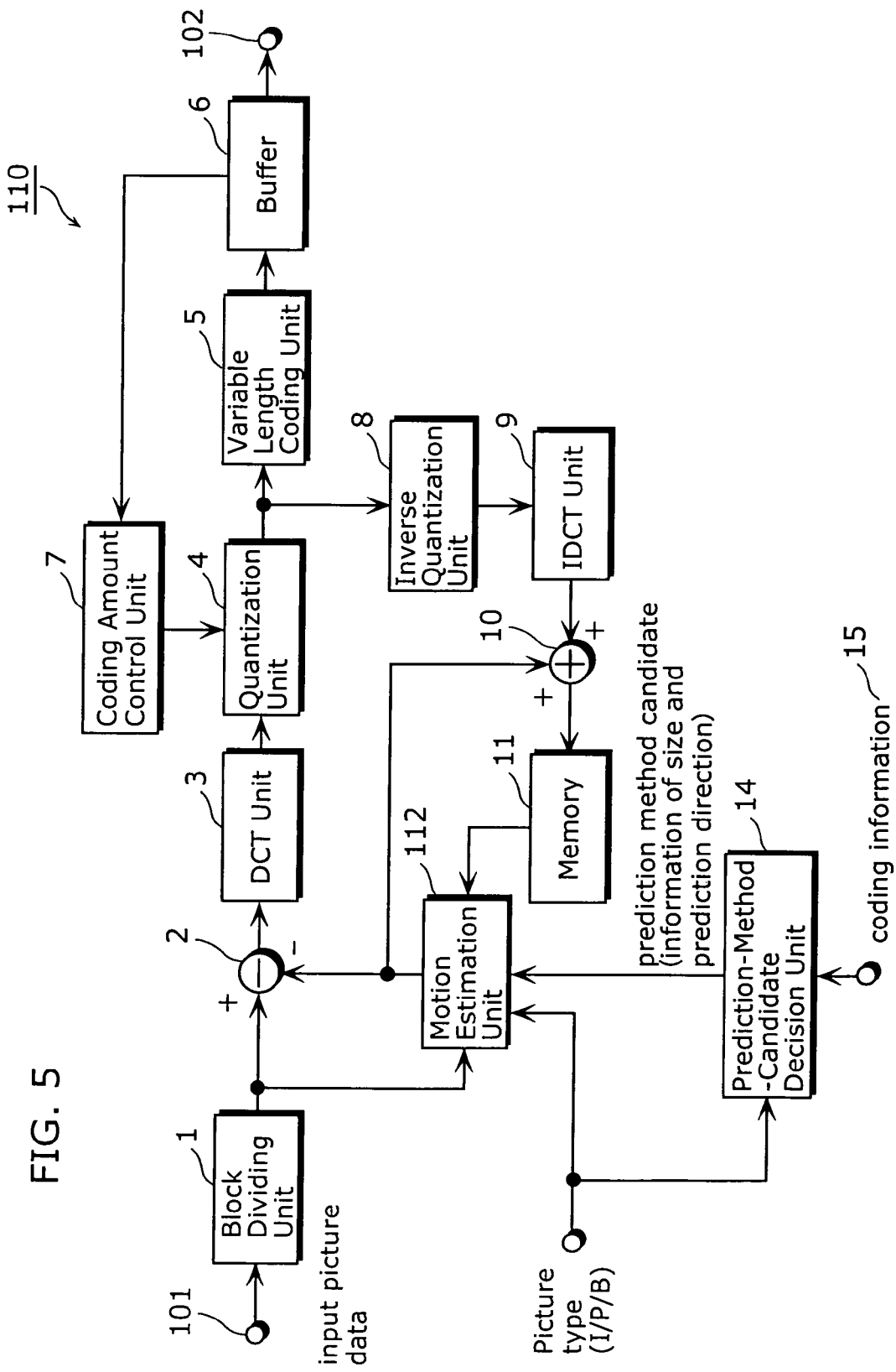
FIG. 5 is a block diagram showing a functional structure of a picture encoding device according to the second embodiment of the present invention.

FIG. 5 is a block diagram showing a functional structure of a picture encoding device 110 according to the second embodiment of the present invention. As shown in FIG. 5, the picture encoding device 110 includes a block dividing unit 1, a subtractor 2, a DCT unit 3, a quantization unit 4, a variable length coding unit 5, a buffer 6, a coding amount control unit 7, an inverse quantization unit 8, an IDCT unit 9, an adder 10, a memory 11, a motion estimation unit 112, and a prediction-method-candidate decision unit 14. Note that the reference numerals in FIGS. 1 and 2 are assigned to identical elements in FIG. 5, so that the details of those elements are same as described above. A characteristic element in the second embodiment is the prediction-method-candidate decision unit 14.

The prediction-method-candidate decision unit 14 has a following function, in addition to the function of the prediction-method-candidate decision unit 13 of the above-described first embodiment. The prediction-method-candidate decision unit 14 calculates difficulty in coding, based on information 15 regarding the coding (hereinafter, referred to as "coding information"). Then, only if the calculated difficulty is greater than a predetermined threshold value, the prediction-method-candidate decision unit 14 decides, as a candidate, a prediction method by which a forward direction or a backward direction is set to a motion direction.

Furthermore, in the calculation of the prediction-method-candidate decision unit 14, the bigger a size of a picture to which the block belongs is, the higher the difficulty becomes; the greater an amount of the encoded date is, the greater the difficulty becomes; the bigger a frame rate of the picture is, the greater the difficulty becomes; and the higher complexity of the picture to which the block belongs is, the greater the difficulty becomes.

Note that the complexity of a picture means a size of high-frequency component of the picture, a size of intensity variance of each block, or a size of an edge of the block.

Figure 6:
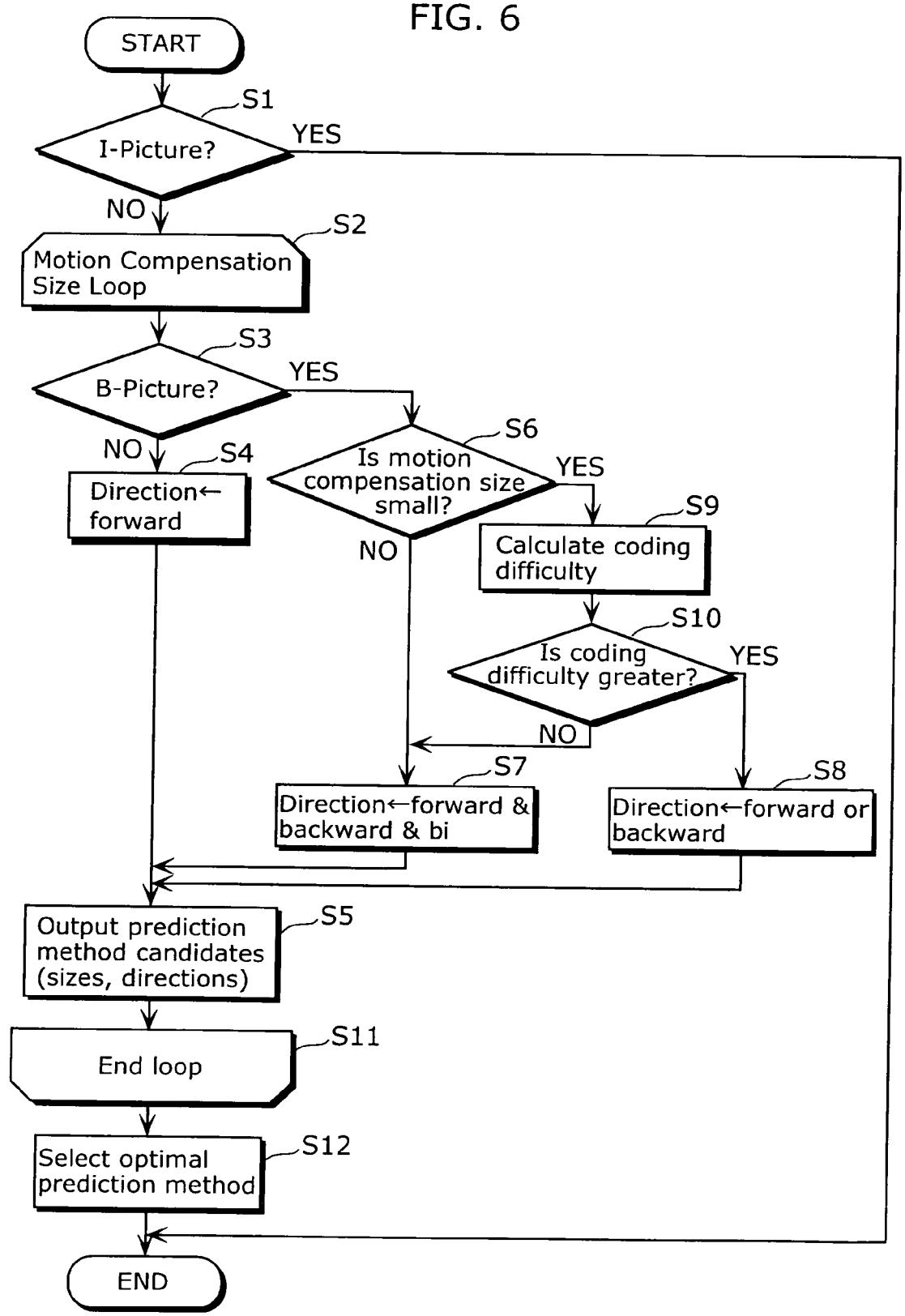
FIG. 6 is a flowchart showing processing for deciding a prediction-method-candidate, performed by the picture encoding device according to the second embodiment of the present invention.

The prediction-method-candidate decision unit 14 selects a prediction method candidate based on input coding information 15, according to a flowchart as shown in FIG. 6. Note that the step numerals in FIG. 4 are assigned to identical steps in FIG. 6, so that the details of those steps are same as described above.

If a picture type of a current picture is B-picture and a motion compensation size set in a prediction method candidate is smaller than the above-mentioned predetermined size (YES at S6), then the prediction-method-candidate decision unit 14 calculates, at Step S9, coding difficulty based on coding information of the current picture.

Then, the prediction-method-candidate decision unit 14 determines, at Step S10, whether or not the coding difficulty is greater than a predetermined threshold value. Only if the coding difficulty is greater than the predetermined threshold value (YES at S10), then, at Step S8, bi-directional prediction is prohibited to be selected as the prediction direction of the prediction method candidate, and a forward direction or a backward direction is set to the prediction direction. On the other hand, if the coding difficulty is smaller than the predetermined threshold value (NO at S10), then, at Step S7, the prediction direction is set to any of the forward direction, the backward direction, and the bi-direction (S7).

With the above structure, only when the coding difficulty is greater than the predetermined threshold value, the bi-directional prediction is prohibited to be selected if the motion compensation size is smaller than the predetermined size. Therefore, it is possible to efficiently reduce motion vectors, when increase of a coding amount of motion vectors significantly affects the whole coding amount.

Figure 7:
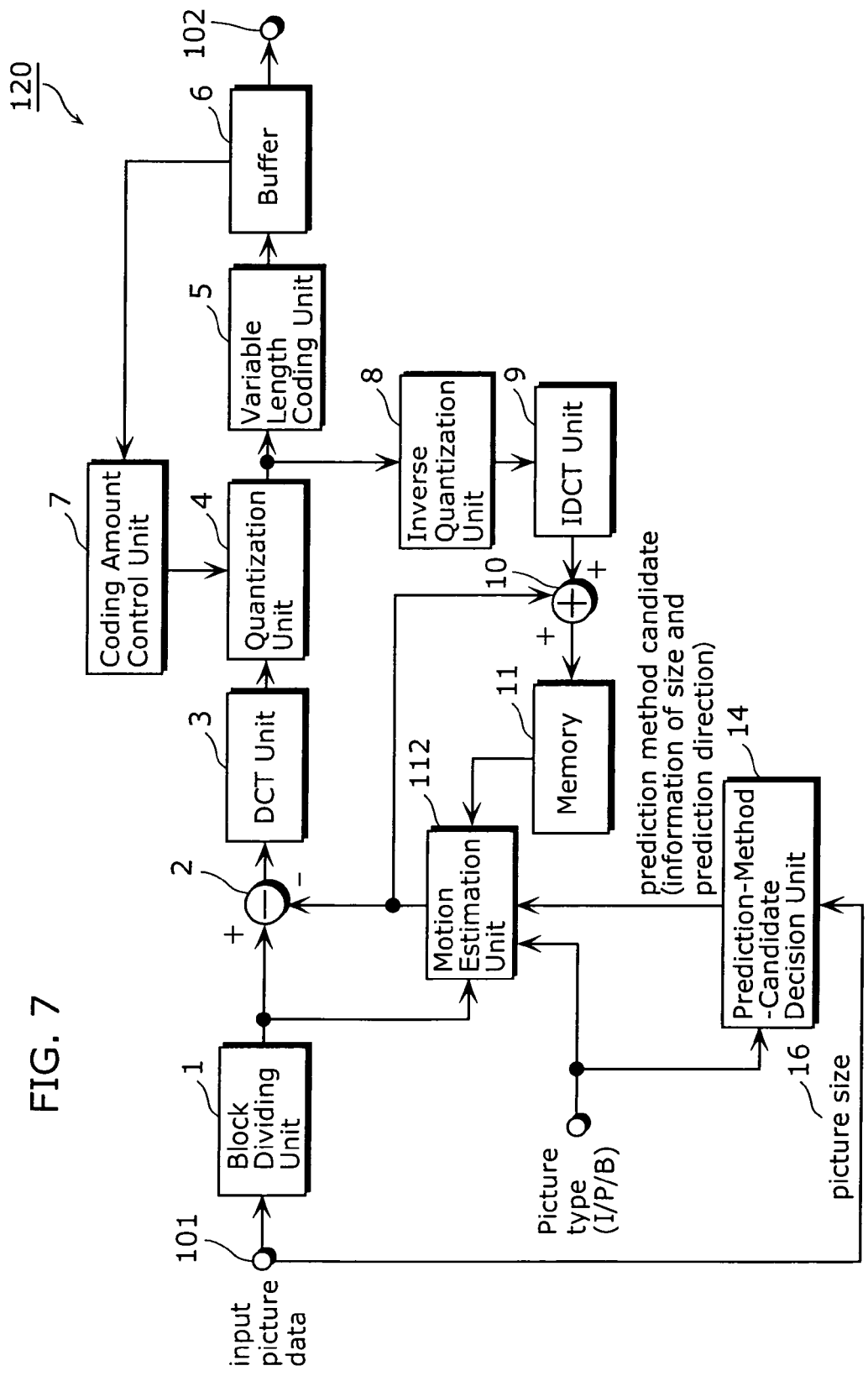
FIG. 7 is a block diagram showing a functional structure of the picture encoding device according to the second embodiment, when a coding difficulty is calculated using a picture size.

Note that, in the second embodiment, the coding difficulty may be decided based on a picture size 16 which is a size of the input picture and one of the coding information 15. A picture encoding device, in which the coding difficulty is calculated based on the input picture size 16, has a structure shown in FIG. 7 as one example. The prediction-method-candidate decision unit 14 in the picture encoding device 120 of FIG. 7 decides the coding difficulty using information representing the input picture size 16. Thereby, it is possible to prevent a problem that the number of motion vectors is significantly increased and eventually the coding amount of the motion vectors is increased, when a picture to be encoded is B-picture, has a great number of macroblocks and a small motion compensation size, but uses bi-directional prediction. Moreover, it is also possible to reduce the number of memory accesses and difference calculations in motion compensation for each picture, since the numbers of the memory accesses and difference calculations are increased as the picture size 16 is increased.

Figure 8:
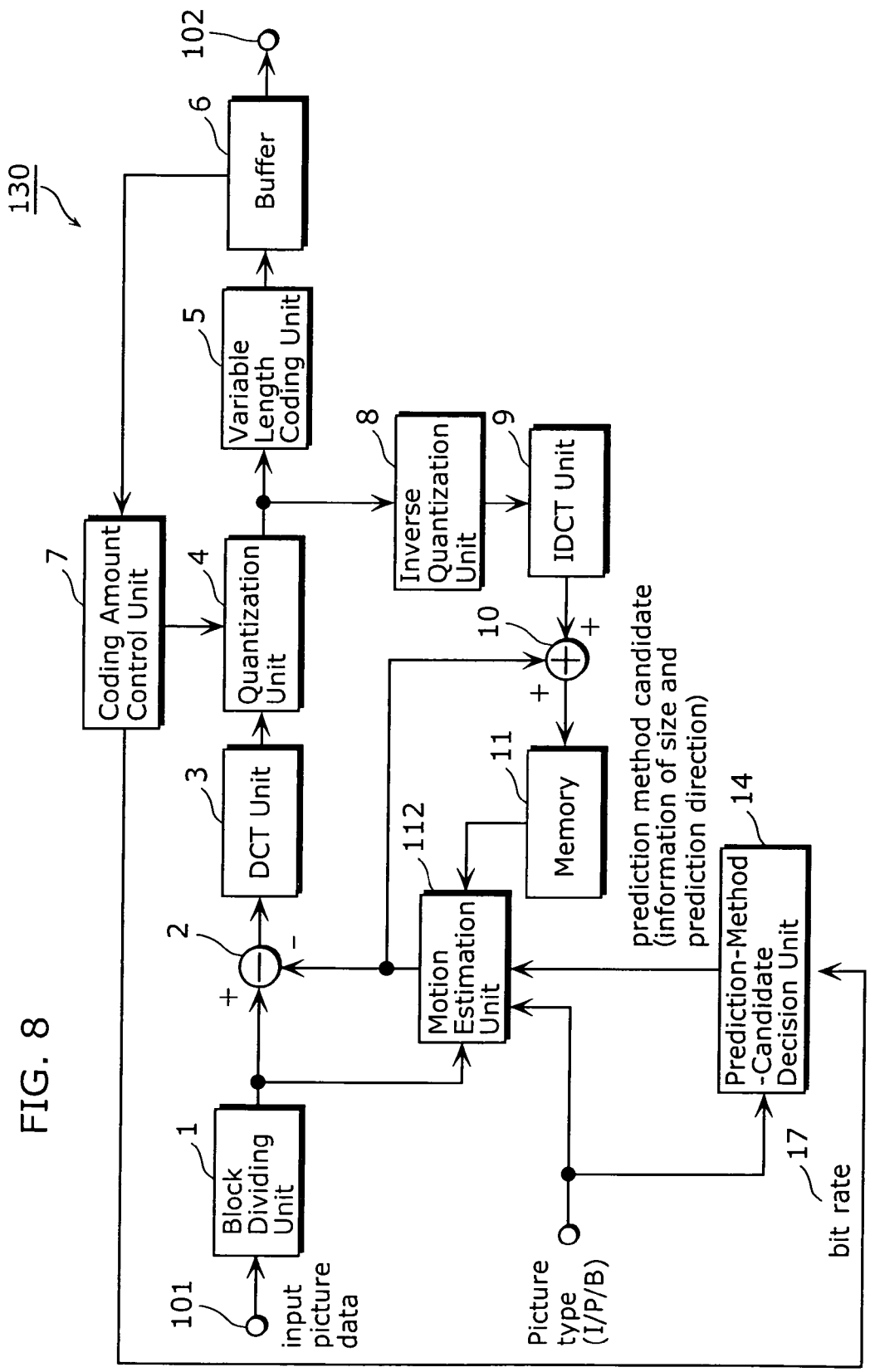
FIG. 8 is a block diagram showing a functional structure of the picture encoding device according to the second embodiment, when the coding difficulty is calculated using a bit rate.

Further, in the second embodiment, the coding difficulty may be decided based on a bit rate (or a coding amount) which is one of the coding information 15. That is, when a generated coding amount is greater than a target coding amount, or when the target coding amount itself is small, it is determined that the coding difficulty is great, and bi-directional prediction is prohibited considering that a motion compensation size is small. A picture encoding device, in which the coding difficulty is calculated based on such a bit rate, has a structure shown in FIG. 8 as one example. The prediction-method-candidate decision unit 14 in the picture encoding device 130 of FIG. 8 judges the coding difficulty using information representing an input bit rate 17. In this case, when, for example, an available coding amount is not allocated adequately to motion vectors, it is possible to reduce increase of the total coding amount due to increase of motion vectors.

Figure 9:
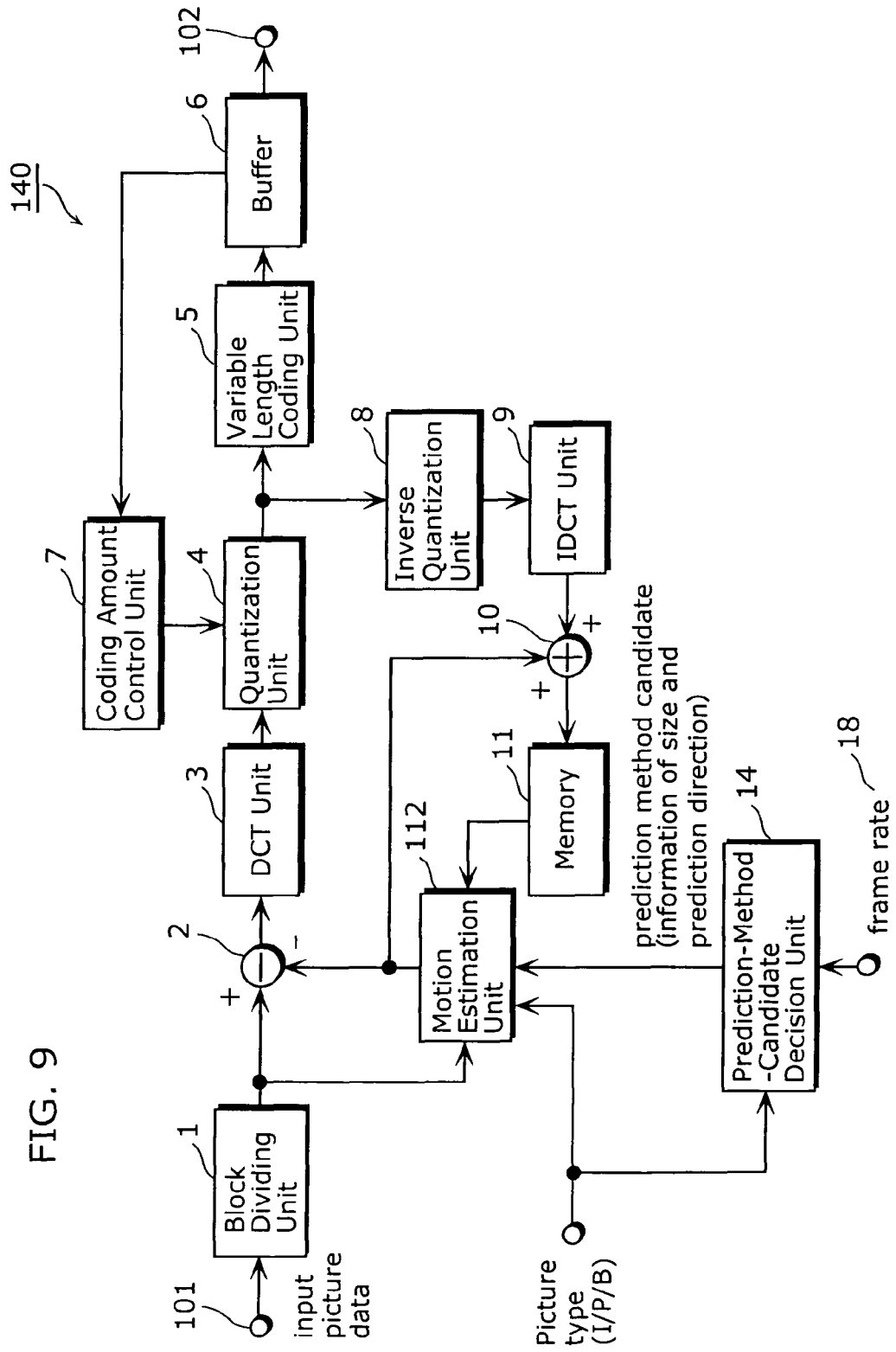
FIG. 9 is a block diagram showing a functional structure of the picture encoding device according to the second embodiment, when the coding difficulty is calculated using a frame rate.

Furthermore, in the second embodiment, the coding difficulty may be decided based on a frame rate which is one of the coding information 15. That is, when the frame rate is high, the bi-directional prediction is prohibited considering that the motion compensation size is small. A picture encoding device, in which the coding difficulty is calculated based on such a frame rate, has a structure shown in FIG. 9 as one example. The prediction-method-candidate decision unit 14 in the picture encoding device 140 of FIG. 9 judges the coding difficulty using information representing an input frame rate 18. In this example, it is possible to reduce the number of memory accesses and difference calculations in motion compensation for each unit time, since the number of memory accesses and the difference calculations are increased as the frame rate 18 is increased.

Figure 10:
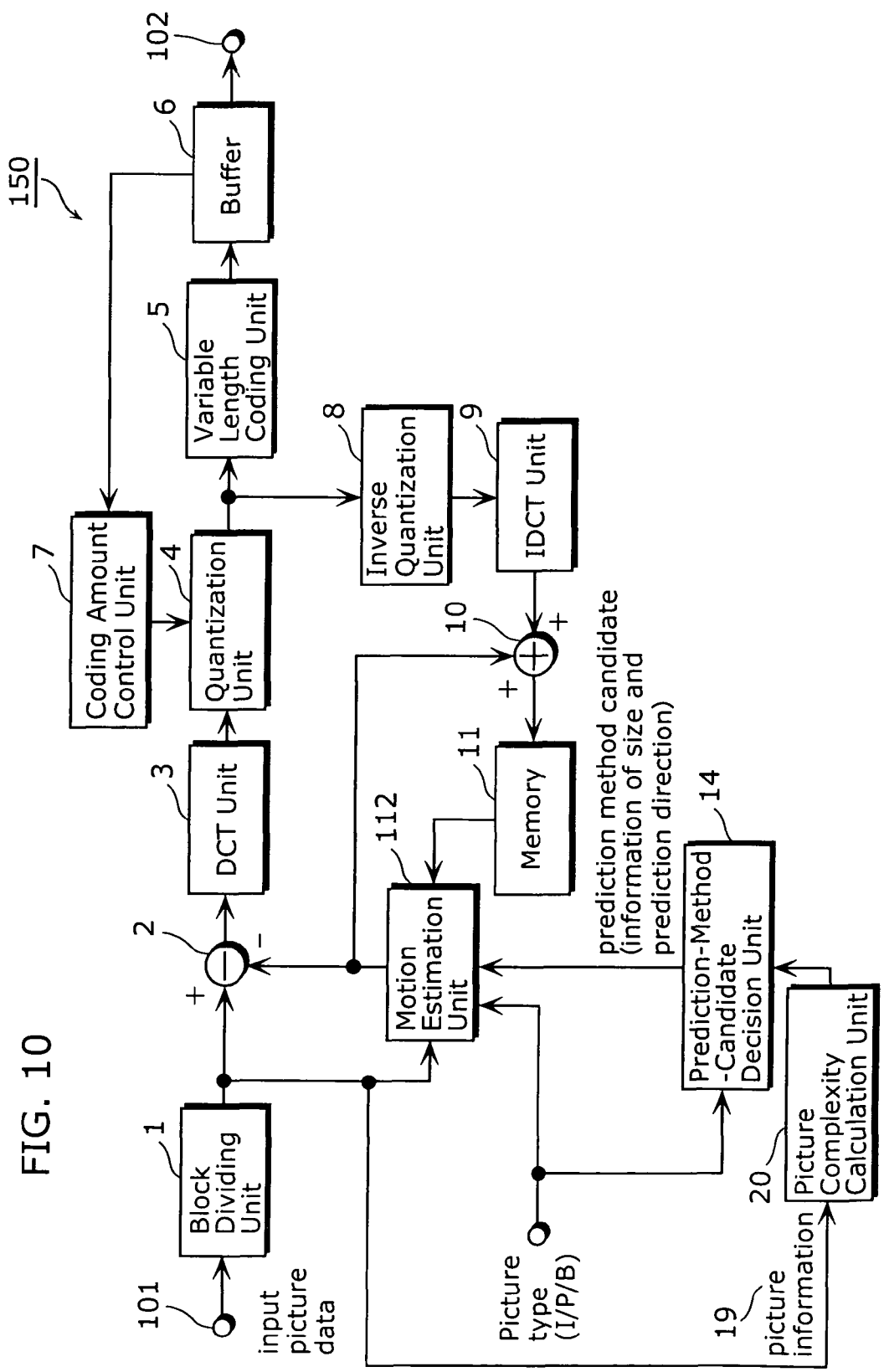
FIG. 10 is a block diagram showing a functional structure of the picture encoding device according to the second embodiment, when the coding difficulty is calculated using picture complexity.

Still further, in the second embodiment, the coding difficulty may be decided based on picture complexity. The picture complexity is one of the coding information 15 and calculated from information regarding a picture, such as a size of high-frequency component of the picture, a size of intensity variance of each block, or a size of an edge of the block, which is one of the coding information 15. A picture encoding device, in which the coding difficulty is calculated based on the picture complexity, has a structure shown in FIG. 10 as one example. The prediction-method-candidate decision unit 14 in the picture encoding device 150 of FIG. 10 judges the coding difficulty using the picture complexity inputted from a picture complexity calculation unit 20. The picture complexity calculation unit 20 is an unit which calculates the picture complexity based on picture information 19, such as high-frequency component of the input picture. In this example, when the picture is not complicated and an effect of small motion compensation size on coding of the picture is small, it is also possible to prevent that a great amount of coding amount is used for motion vectors.

Moreover, the motion compensation size, by which bi-directional prediction is decided to be prohibited, is not necessary to be a fixed value, but may be varied depending on the coding difficulty. For example, the motion compensation size, by which bi-directional prediction is decided to be prohibited, is selected from various sizes, depending on a size of the picture size 16, the bit rate 17, the frame rate 18, and the picture complexity. Thereby, it is possible, without lowering the coding efficiency, to reduce the lowering of the coding efficiency due to the increase of coding amount, which results from the increase of motion vectors.

Note that, in the above-described first and second embodiments, if a B-picture is encoded, basically two pictures are referred to by the B-picture. However, the B-picture may refer to only one picture.

Note also that the bi-directional prediction may be permitted even if the motion compensation size is small, only in a mode where motion can be estimated from motion vectors of other blocks and the motion vectors are not encoded, like a direct mode of the MPEG-4A VC, because a coding amount of motion vectors is not increased in the mode.

Note that the elements in each of the block diagrams of the first and second embodiments (FIGS. 2 and 5, and the like) are typically implemented into a LSI which is an integrated circuit. These elements may be integrated separately, or a part or all of them may be integrated into a single chip (For example, functional blocks except a memory may be integrated into a single chip).

Here, the integrated circuit is referred to as a LSI, but the integrated circuit can be called an IC, a system LSI, a super LSI or an ultra LSI depending on their degrees of integration.

Further, the integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

Furthermore, if due to the progress of semiconductor technologies or their derivations, new technologies for integrated circuits appear to be replaced with the LSIs, it is, of course, possible to use such technologies to implement the functional blocks as an integrated circuit. Biotechnology and the like can be applied to the above implementation.

Note also that only a means for storing data to be encoded or decoded, among these functional blocks, may be realized as another structure, without being integrated into the single chip.

INDUSTRIAL APPLICABILITY

The picture encoding method according to the present invention has a means for compressing image data with high efficiency. The picture encoding method is useful for accumulating image for long-time recording, or for transmitting distributed image whose data amount is small. Furthermore, the picture encoding method can be applied to recording for video-telephones and for television broadcasting.

The invention claimed is:

1. A picture encoding method of encoding a picture on a block-by-block basis, said method comprising:
    deciding a candidate for a prediction method in which a size of motion compensation and a direction of motion prediction are set for a block to be coded;
    applying motion estimation to the block, by selecting an optimal prediction method using the decided candidate for the prediction method, calculating a motion vector for the block using the selected optimal prediction method, and generating predictive image of the block using the calculated motion vector; and
    encoding an image of the block using the generated predictive image,
    wherein said deciding of the candidate for the prediction method includes:
        (i) determining whether or not the block belongs to a B-picture;
        (ii) determining, when it is determined that the block belongs to the B-picture, whether or not the size of motion compensation is smaller than a predetermined threshold value; and
        (iii) setting, as the candidate for the prediction method, only one of a forward direction and a backward direction as the direction of motion prediction when it is determined that the size of motion compensation is smaller than the predetermined threshold value,
    wherein the size of motion compensation is a size of a part formed by dividing the block into a plurality of parts, and
    wherein in said applying motion estimation, motion compensation is performed for each of the plurality of parts included in the block to calculate a motion vector for each of the plurality of parts.

2. The picture encoding method according to claim 1,
    wherein in said deciding, a plurality of candidates for the prediction method are decided for a plurality of predetermined sizes of motion compensation, respectively, and
    wherein in said applying of the motion estimation, the optimal prediction method is selected from the decided plurality of candidates as the decided candidate for the prediction method used to calculate the motion vector for the block.

3. The picture encoding method according to claim 1,
    wherein, when the block belongs to a B-picture and the size of motion compensation is smaller than the predetermined threshold value, said deciding further includes:
        calculating a difficulty in said encoding; and
        selecting, as the candidate for the prediction method, a prediction method in which only one of a forward direction and a backward direction is set to the direction of motion prediction, only if the calculated difficulty is greater than a predetermined threshold value.

4. The picture encoding method according to claim 3,
    wherein in said deciding, the bigger a size of the picture to which the block belongs to is, the greater the calculated difficulty becomes.

5. The picture encoding method according to claim 3,
    wherein in said deciding, the larger a data amount of the image encoded in said encoding is, the greater the calculated difficulty becomes.

6. The picture encoding method according to claim 3,
    wherein in said deciding, the bigger a frame rate of the picture is, the greater the calculated difficulty becomes.

7. The picture encoding method according to claim 3,
    wherein in said deciding, the higher a complexity of the picture to which the block belongs to is, the greater the calculated difficulty becomes.

8. The picture encoding method according to claim 7,
    wherein in said deciding, the complexity of the picture is one of a size of a high-frequency component of the picture, a size of intensity variance of the block, and a size of an edge of the block.

9. A picture encoding device which encodes a picture on a block-by-block basis, said device comprising:
    a prediction-method-candidate decision unit operable to decide a candidate for a prediction method in which a size of motion compensation and a direction of motion prediction are set for a block to be coded;
    a motion estimation unit operable to apply motion estimation to the block, by selecting an optimal prediction method using the decided candidate for the prediction method, calculating a motion vector for the block using the selected optimal prediction method, and generating a predictive image of the block using the calculated motion vector; and an encoding unit operable to encode an image of the block using the generated predictive image, wherein said prediction-method-candidate decision unit is further operable to (i) determine whether or not the block belongs to a B-picture, (ii) determine, when it is determined that the block belongs to the B-picture, whether or not the size of motion compensation is smaller than a predetermined threshold value; and (iii) set, as the candidate for the prediction method, only one of a forward direction and a backward direction as the direction of motion prediction when it is determined that the size of motion compensation is smaller than the predetermined threshold value, wherein the size of motion compensation is a size of a part formed by dividing the block into a plurality of parts, and wherein said motion estimation unit performs motion compensation for each of the plurality of parts included in the block to calculate a motion vector for each of the plurality of parts.

10. An integrated circuit used for encoding a picture on a block-by-block basis, said integrated circuit comprising:

a prediction-method-candidate decision unit operable to decide a candidate for a prediction method in which a size of motion compensation and a direction of motion prediction are set for a block to be coded;

a motion estimation unit operable to apply motion estimation to the block, by selecting an optimal prediction method using the decided candidate for the prediction method, calculating a motion vector for the block using the selected optimal prediction method, and generating a predictive image of the block using the calculated motion vector; and an encoding unit operable to an encode image of the block using the generated predictive image, wherein said prediction-method-candidate decision unit is further operable to (i) determine whether or not the block belongs to a B-picture, (ii) determine, when it is determined that the block belongs to the B-picture, whether or not the size of motion compensation is smaller than a predetermined threshold value; and (iii) set, as the candidate for the prediction method, only one of a forward direction and a backward direction as the direction of motion prediction when it is determined that the size of motion compensation is smaller than the predetermined threshold value, wherein the size of motion compensation is a size of a part formed by dividing the block into a plurality of parts, and wherein said motion estimation unit performs motion compensation for each of the plurality of parts included in the block to calculate a motion vector for each of the plurality of parts.

11. A picture encoding method of encoding a picture on a block-by-block basis, said method comprising:

deciding a candidate for a prediction method in which a size of motion compensation and a direction of motion prediction are set for a block to be coded;

applying motion estimation to the block, by selecting an optimal prediction method using the decided candidate for the prediction method, calculating a motion vector for the block using the selected optimal prediction method, and generating predictive image of the block using the calculated motion vector; and encoding an image of the block using the generated predictive image, wherein said deciding of the candidate for the prediction method includes:
(i) determining whether or not the block belongs to a B-picture;
(ii) determining, when it is determined that the block belongs to the B-picture, whether or not the size of motion compensation is smaller than a predetermined threshold value; and
(iii) setting, as the candidate for the prediction method, only one of a forward direction and a backward direction as the direction of motion prediction when it is determined that the size of motion compensation is smaller than the predetermined threshold value, wherein the size of motion compensation is a size of one part among a plurality of parts which are formed by dividing the block, the plurality of parts having different sizes, and wherein in said applying motion estimation, motion compensation is performed for each of the plurality of parts included in the block to calculate a motion vector for each of the plurality of parts.

* * * * *